Nov. 7, 1967  R. W. STINSON  3,351,927
SIGNAL LIMITS DETECTOR
Filed Dec. 3, 1964  3 Sheets-Sheet 1

INVENTOR.
R.W. STINSON
BY
ATTORNEY

United States Patent Office 3,351,927
Patented Nov. 7, 1967

3,351,927
SIGNAL LIMITS DETECTOR
Richard W. Stinson, Columbus, Ohio, assignor to Western Electric Company, Incorporated, New York, N.Y., a corporation of New York
Filed Dec. 3, 1964, Ser. No. 415,684
4 Claims. (Cl. 340—248)

ABSTRACT OF THE DISCLOSURE

An electrical system for comparing the instantaneous voltage values of a varying signal with instantaneous voltage values of generated upper and lower limit signals which vary in accordance with a desired pulse shape.

This invention relates to a signal limits detector and particularly relates to the detection of out-of-limits variations of a signal.

Background of the invention

Various types of electronic circuits are designed to produce an output signal having defined varying pulse shapes. In some instances it is necessary to determine whether or not instantaneous voltage levels of the output signal fall within required upper and lower limits necessary for proper circuit operation. Since the output signal may vary in accordance with the pulse shape, a difficulty arises in establishing upper and lower limits which also must vary in accordance with the definition of the pulse shape.

In addition, conventional limits detectors have included a signal generator which feed a common signal into an apparatus under test and further into two attenuator networks for establishing upper and lower limits for comparison with a signal developing at the output of the apparatus under test. Thereafter, a time-sharing switching network alternately applies the attenuated upper and lower limit signals in comparison with the signal developed at the apparatus output. Since the comparison is time-shared, the apparatus output signal is never continuously and simultaneously compared with both the upper and lower limits signals. The use of this system creates a distinct disadvantage where it is necessary to compare simultaneously the signal being tested with both of the upper and lower limit signals.

Summary of the invention

It is, therefore, an object of this invention to provide a new and improved signal limits detector for detecting variations of a signal beyond required limits.

Another object of the invention is to provide a signal limits detector which is capable of comparing and detecting instantaneous values of the signal being tested simultaneously with respective instantaneous values of upper and lower signal levels.

With these and other objects in view, the present invention contemplates means for producing upper and lower limit signals which vary in accordance with the desired pulse shape of a signal under test. The signal under test is compared with the limit signals and variations of the signal above or below the respective limit signals are detected to indicate the undesirable characteristics of the signal.

Functional generators produce a pair of signals which substantially conform to the desired pulse shape of the signal under test. The two generated signals develop varying limits having instantaneous voltage values which establish instantaneous upper and lower limits. The signal under test is compared with each of the signals produced by the functional generators and variations above the upper limit signal and below the lower limit signal are detected to provide an indication of such signal variations beyond the limit signals.

Other objects and advantages of the invention will appear from the following detailed description of a specific embodiment when read in conjunction with the appended drawings.

Detailed description

Figure 1:
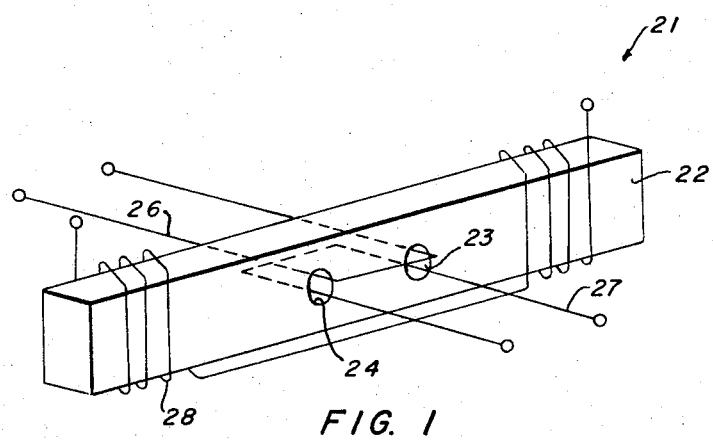
FIG. 1 is a perspective view showing a sensing element whose operating characteristics are to be tested.

Referring now to FIG. 1, a sensing element 21 includes a magnetic rod 22 formed with a pair of spaced apertures 23 and 24. A first single turn winding 26 is looped in one direction through the openings 23 and 24 and a second single turn winding 27 is looped in another direction through the openings. A third winding 28 is wound about the rod 22 as shown.

The sensing element 21 is utilized to sense the condition of various types of circuits wherein the winding 28 is connected to the circuit to be sensed. The single turn winding 26 functions as an interrogate winding to initiate a sensing procedure and the single turn winding 27 functions as a readout winding to provide information representative of the condition of the sensed circuit. A specified procedure is followed in testing the sensing element 21 wherein input signals are applied to the windings 26 and 28 and an output is obtained from the winding 27. By analyzing the output signal obtained from the winding 27, various characteristics of the sensing element 21 can be determined.

Figure 2:
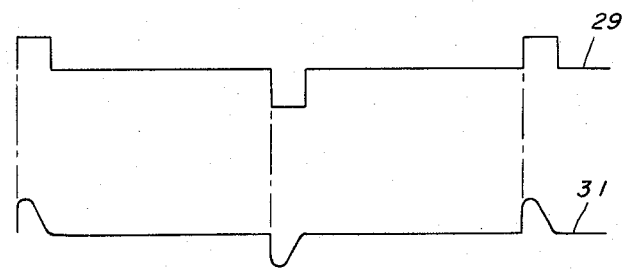
FIGS. 2 and 3 are views of respective input and output signals associated with the sensing element of FIG. 1.

Referring to FIGS. 1 and 2, in following the procedure for obtaining the output signal to be analyzed, a high frequency current signal 29 having repetitive positive and negative going square pulses is applied to the single turn winding 26 of the sensing element 21. By transformer action, an output voltage signal 31 is developed across the read-out winding 27 wherein the signal has positive and negative going pulses which coincide with the positive and negative going pulses, respectively, of the input current signal 29. A low frequency sinusoidal signal is applied to the winding 28 and modulates the high frequency output voltage signal 31 appearing on the read-out winding 27.

Figure 3:
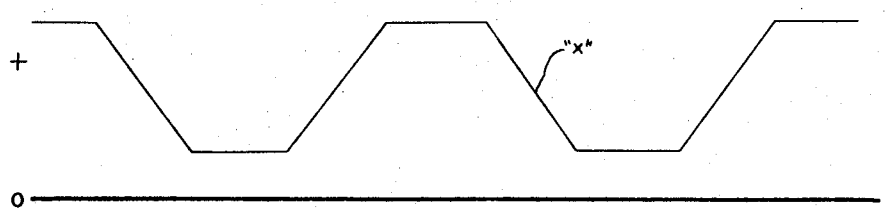

As shown in FIG. 3, a voltage signal $x$ having an ideal, defined pulse shape is obtained by demodulating the high frequency output signal. The defined pulse shape of the signal $x$, as shown in FIG. 3, can vary slightly from the definition of the desired pulse shape and still indicate that the sensing element 21 satisfies necessary requirements or proper circuit function. Hence, by analyzing the signal $x$, it can be determined whether or not instantaneous voltage values of the signal $x$ vary within predetermined instantaneous voltage limits and thereby indicate acceptability of the sensing element 21.

Figure 4:
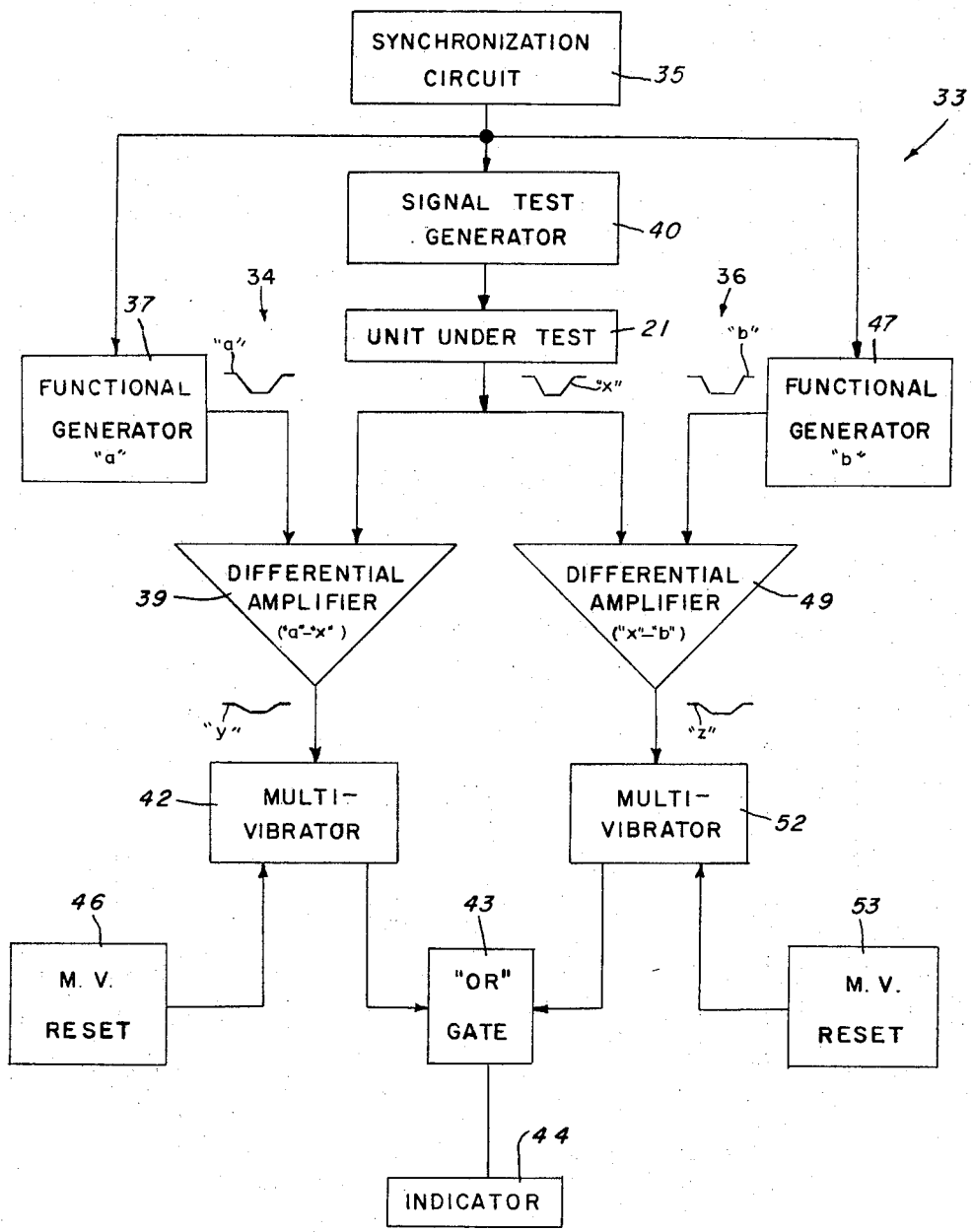
FIG. 4 is a view of a block diagram of a signal limits detector which analyzes an output signal such as that shown in FIG. 3 to determine whether or not the signal remains within varying signal limits.

Referring now to FIG. 4, a signal limits detector 33 receives and analyzes the signal $x$ under test and determines whether or not the signal varies past predetermined upper and lower voltage values. It is noted that while the defined pulse shape of the output signal $x$ (FIG. 3) is specifically related to the sensing element 21, the signal limits detector 33 can be utilized to detect out-of-limits variations of other signals having different pulse shapes and is not limited to the specific pulse shape described herein.

The detector 33 includes a synchronization circuit 35 which periodically synchronizes the signal producing components of the detector as well as a signal test generator 40 which provides the testing pulses for the unit under test such as the sensor element 21. By utilizing the synchronization circuit 35, a proper phase relationship is assured between the signal $x$ and developed upper and lower limits signals. The detector 33 also includes a pair of channels 34 and 36, each of which receive the demodulated signal $x$ representative of the output obtained from the readout winding 27 of the sensing element 21.

Figure 5:
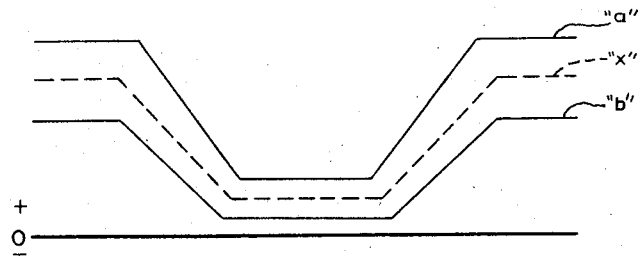
FIG. 5 is a view of a theoretical varying limits envelope which conforms substantially to a desired pulse shape of a signal under test and further shows an ideal condition with the signal under test.

The channel 34 includes a conventional functional generator 37 which is synchronized by control of the synchronization circuit 35 and develops an upper limits signal $a$, as shown in FIG. 5, conforming to the desired, ideal pulse shape of the demodulated signal $x$. The functional generator 37 could include, for example, a network for generating repetitive square wave pulses, a network for integrating the square wave pulses and a network for clipping the peaks of the integrated pulses to develop the signal $a$. It is noted that while the pulse shape of the signal $a$ is substantially identical to the desired pulse shape of the signal $x$, the instantaneous voltage values of the signal $a$ establishes an upper voltage limit which varies in accordance with the desired pulse shape.

Figure 6:
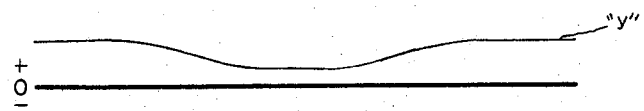
FIGS. 6 and 7 are wave forms which may be analyzed at points in the block diagram of FIG. 4 to reveal an ideal condition.

The channel 34 also includes a differential amplifier 39 which receives inputs comprising the signal $x$ to be tested and the signal $a$ developed by the functional generator 37. The output of the differenital amplifier 39 is a differential signal $y$, as shown in FIG. 6, which represents the instantaneous voltage differences between the developed signal $a$ and the signal $x$ under test. As shown in FIG. 6, the differential signal $y$ varies within a positive voltage range providing the instantaneous voltage values of the signal $x$ under test are also less than the instantaneous voltage values of the developed signal 38.

Referring further to FIG. 4, the differential signal $y$ is coupled to a bi-stable multivibrator 42 which requires an input of a negative voltage to switch the multivibrator from one state to another whereafter the multivibrator remains in the switched state until it is reset. In the event the multivibrator 42 is switched, a continuous detection signal is developed at the output of the multivibrator which is coupled to an "OR" gate 43. It is noted that the detection signal appearing at the output of the multivibrator 42 will continue until the multivibrator is reset. The "OR" gate 43 controls an indicator 44, such as a lamp or audible device, to indicate that the signal $x$ under test has exceeded, at some point, the instantaneous voltage value of the upper limits signal $a$. In the event any instantaneous voltage value of the signal $x$ exceeds the respective instantaneous voltage value of the signal $a$, the diffenential signal varies in a negative potential range whereby the multivibrator 42 is switched from one state to another and develops the continuous detection signal which operates the "OR" gate 43. In this manner, the indicator 44 is operated to indicate to an operator that the sensing element 21 does not satisfy the required conditions necessary for circuit function.

Also included in the channel 34 is a multivibrator reset circuit 46 which is operated by the operator and is connected to the bi-stable multivibrator 42 for switching the multivibrator to the original state, thereby conditioning the multivibrator for subsequent switching when a negative voltage is received from the differential amplifier 39.

Figure 7:
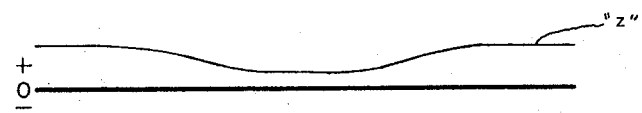

The channel 36 includes circuits which are similar to the circuits connected in the channel 34 wherein a function generator 47, which is also synchronized by the synchronization circuit 35, develops a lower limit signal $b$, as shown in FIG. 5. The signal $b$ has the same defined pulse shape as the desired, ideal pulse shape of the signal $x$ but has instantaneous voltage values below the respective instantaneous values of the signal $x$. The functional generator 47 could include the same type of networks as those of the functional generator 37 to obtain the signal $b$. The signals $x$ and $b$ are fed into a differential amplifier 49 which develops a differential signal $z$, as shown in FIG. 7, representative of the difference between the signal $x$ under test and the lower limit signal $b$. The differential signal $z$ will vary within a positive potential range providing the instantaneous voltage values of the signal $x$ do not vary below the respective instantaneous voltage values of the lower limits signal $b$.

The signal $z$ developed by the differential amplifier 49 is coupled to a bi-stable multivibrator 52 which requires a negative voltage to switch the multivibrator from an original state of operation to another state of operation. If the instantaneous voltage values of the tested signal $x$ vary below the respective instantaneous voltage values of the signal $b$, the differential signal $z$ will vary within a negative potential range whereby the multivibrator 52 is switched from the original state to another state and remains in the switched state until a reset operation is initiated by the operator. As the multivibrator 52 is switched from one state to another, a continuous detection signal is developed at the output of the multivibrator and is coupled to the "OR" gate 43, whereby the indicator 44 is operated to indicate that the signal $x$ has instantaneous voltage values which are below the respective instantaneous values of the lower limits signal $b$. Again, this indicates that the sensing element 21 does not satisfy the required conditions necessary for circuit operation.

A multivibrator reset circuit 53 is connected to the multivibrator 52 to facilitate the switching of the multivibrator to the original state, thereby conditioning the multivibrator for subsequent switching when instantaneous voltage values of the signal $x$ are below the respective instantaneous values of the signal $b$.

As previously discussed, the synchronization circuit 35 develops a periodical synchronizing pulse which is fed to the signal test generator 40 and the functional generators 37 and 47. The signal test generator 40 develops the pulses which are fed to the unit 21 under test whereby the output signal $x$ is developed. Since the functional generators 37 and 47 are synchronized simultaneously with the signal test generator 40, the signals $a$, $b$ and $x$ will be in phase for proper limits comparison.

Figure 8:
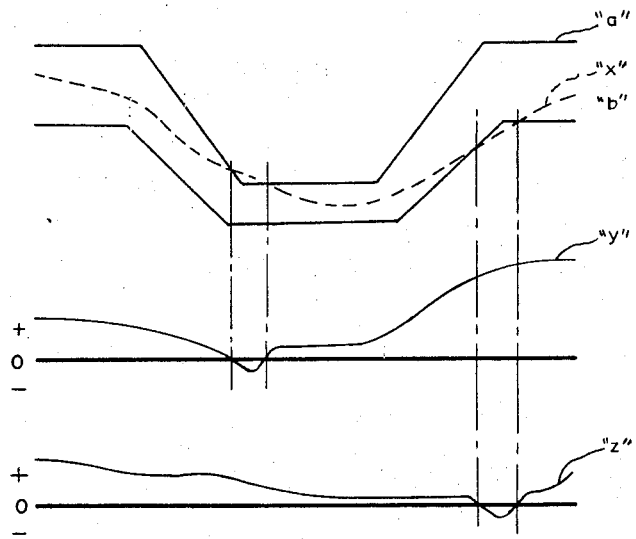
FIG. 8 is a view showing the theoretical limits envelope with the signal under test undesirably varying beyond the limits of the envelope and further shows wave forms which may be analyzed at points in the block diagram of FIG. 4 which relate to conditions of the block diagram operation when the signal under test varies beyond the limits of the envelope.

Referring now to FIG. 5, the upper limits signal $a$ and the lower limits signal $b$ theoretically provide a limits envelope within which the instantaneous voltage values of the signal $x$ under test must fall to indicate that the electrical characteristics of the sensing element 21 satisfy the required conditions. As shown in FIG. 8, instantaneous voltage values of the signal $x$ undesirably vary beyond the upper limits of a portion of the upper limits signal $a$ and also undesirably vary below a portion of the lower limits $b$. As further shown in FIG. 8, variations of the signal $x$ beyond the upper limits signal $a$ results in instantaneous negative voltage values of the signal $y$ which are sufficient to switch the multivibrator 42, whereby the output detection signal is coupled from the multivibrator to the "OR" gate 43 which controls and operates the indicator 44 to indicate the undesirability of the tested sensing element 21. In addition, as further shown in FIG. 8, variations of the signal $x$ below the lower limits signal b results in the development of negative instantaneous voltage values in the differential signal z. As a result of the negative potential of the differential signal z, the state of the multivibrator 52 is switched, whereby the detection signal is coupled to the "OR" gate 43 to again operate the indicator 44, thereby revealing that the sensing element 21 has failed the test.

Thus, while the detector 33 is provided with two channels which individually analyze the signal x and thereafter feed the results into the "OR" gate 43, the theoretical application of the detector establishes a test condition wherein the sensing element 21 satisfies the required conditions only if the tested signal and the limits signals fulfill the conditions where: $a>x>b$. Individual conditions must be satisfied in each of the channels 34 and 36 to indicate satisfactory acceptance of the sensing element 21 wherein the condition necessary in the channel 34 is that the instantaneous voltage values of the upper limits signal a is always greater than the respective instantaneous voltage values of the signal x under test. The acceptable condition necessary in the channel 36 is that the instantaneous voltage values of the signal x are always greater than the respective instantaneous voltage values of the lower limits signal b. Hence, if these conditions are not satisfied, either or both of the differential signals y and z provide a negative potential for the respective multivibrators 42 and 52 wherein the indicator 44 is subsequently operated to indicate the deficient sensing element 21.

It is particularly noted that only the outputs of the functional generators 37 and 47 need be changed to facilitate the out-of-limits detection of a signal which has a different defined pulse shape than the pulse shape of the example described herein.

Although the invention has been disclosed and described as applied to a specific application, other embodiments and arrangements may be devised by those skilled in the art without departing from the spirit and scope of the invention.

What is claimed is:

1. A device for detecting out-of-limits variations of a signal being tested, which comprises:
    means for generating a pair of signals having substantially the same pulse shape as an ideal pulse shape of the signal being tested, a first of the pair of generated signals having instantaneous voltage values higher than desired respective instantaneous voltage values of the signal being tested, a second of the pair of generated signals having instantaneous voltage values lower than desired respective instanttaneous voltage values of the signal being tested,
    means for differentially comparing the signal being tested with the pair of generated signals and for developing detection signals when instantaneous voltage values of the signal being tested exceed respective instantaneous voltage values of the first of the pair of generated signals and are below respective instantaneous voltage values of the second of the pair of generated signals, and
    means responsive to the developed detection signals for indicating the out-of-limits variations of the signal being tested.

2. A device for detecting out-of-limits variations of a signal being tested, which comprises:
    a first generator for developing a signal having a pulse shape similar to an ideal pulse shape of the signal being tested, the first generated signal having instantaneous voltage values higher than desired respective instantaneous voltage values of the signal being tested,
    a second generator for generating a second signal having a pulse shape similar to the ideal pulse shape of the signal being tested, the instantaneous voltage values of the generated signal being lower than desired respective instantaneous voltage values of the signal being tested,
    means for determining differences between the instantaneous voltage values of the signal being tested and the respective instantaneous voltage values of the first and second generated signals, respectively, and
    means responsive to instantaneous voltage differences where the voltage values of the signal being tested are greater than the respective voltage values of the first generated signals or less than the respective voltage values of the second generated signal for indicating variations of the signal being tested beyond the voltage values of the first and second generated signals.

3. A device for detecting out-of-limits variations of a signal being tested, which comprises:
    a first channel,
    means in the first channel for generating a signal having substantially the same defined pulse shape as an ideal pulse shape of the signal being tested, the instantaneous voltage values of the generated signal being higher than the respective, desired instantaneous voltage values of the signal being tested,
    means in the first channel for receiving the signal being tested and the generated signal, and for developing a differential signal representative of the differences in instantaneous voltage values of the signal being tested and the generated signal,
    means in the first channel responsive to the differential signal when instantaneous voltage values of the signal being tested exceed respective instantaneous voltage values of the generated signal for developing a detection signal indicative of the instantaneous voltage variations of the signal being tested above the respective instantaneous voltage values of the generated signal of the first channel,
    a second channel,
    means in the second channel for generating a signal having substantially the same defined pulse shape as the ideal pulse shape of the signal being tested, the instanttaneous voltage values of the generated signal of the second channel being lower than the respective, desired instantaneous voltage values of the signal being tested,
    means in the second channel responsive to the differential signal when instantaneous voltage values of the signal being tested vary below respective instantaneous voltage values of the generated signal for developing a detection signal indicative of the instantaneous voltage variations of the signal being tested below the generated signal of the second channel, and
    means responsive to the detection signals developed in either of the channels for indicating out-of-limits variations of the signal being tested.

4. A device for detecting out-of-limits variations of a signal being tested, which comprises:
    a first channel including,
        a functional generator for generating a signal having a pulse shape similar to an ideal pulse shape of the signal being tested, the generated signal having instantaneous voltage values higher than respective, desired instantaneous voltage values of the signal being tested,
        a differential amplifier, the differential amplifier receiving an input including the signal being tested and the generated signal, the differential amplifier developing a differential output signal having negative potential values when the instantaneous voltage values of the signal being tested exceed respective instantaneous voltage values of the generated signal, and
        a multivibrator for developing an output detection signal in response to the negative differential signal developed by the differential amplifier, a second channel including,
   a functional generator for generating a signal having a pulse shape similar to the ideal pulse shape of the signal being tested, the generated signal having instantaneous voltage values lower than respective, desired instantaneous voltage values of the signal being tested,
   a differential amplifier, the differential amplifier receiving an input including the signal being tested and the generated signal, the differential amplifier developing a differential output signal having negative potential values when instantaneous voltage values of the signal being tested are lower than respective instantaneous voltage values of the generated signal, and
   a multivibrator for developing an output detection signal in response to the negative differential signal developed by the differential amplifier,
   an "OR" gate for receiving the detection signals from the first and second channels, and
   an indicator operated by the "OR" gate when the gate receives one of the detection signals from the first or second channels to indicate out-of-limits variations by the signal being tested.

References Cited
UNITED STATES PATENTS 2,756,409  7/1956  Lubkin.

NEIL C. READ, *Primary Examiner.*

D. MYER, *Assistant Examiner.*